US006025846A

United States Patent [19]
Chudley

[11] Patent Number: 6,025,846
[45] Date of Patent: Feb. 15, 2000

[54] APPARATUS AND METHOD FOR DISPLAYING IMAGES OF THREE-DIMENSIONAL OBJECTS TO FIRST AND SECOND USERS FROM DIFFERENT VIEWPOINTS SELECTED BY THE USERS

[75] Inventor: Martin John Chudley, Somerset, United Kingdom

[73] Assignee: Canon Kabushiki Kaisha, Tokyo, Japan

[21] Appl. No.: 08/719,034

[22] Filed: Sep. 24, 1996

Related U.S. Application Data

[63] Continuation of application No. 08/582,665, Jan. 4, 1996, abandoned, which is a continuation of application No. 08/141,621, Oct. 27, 1993, abandoned.

[30] Foreign Application Priority Data

Oct. 30, 1992 [GB] United Kingdom .................. 9222767

[51] Int. Cl.[7] ...................................................... G06F 7/00
[52] U.S. Cl. ............................................................ 345/419
[58] Field of Search .................................... 395/188–121, 395/133–9, 127; 364/468.03, 468.04, 574; 345/419, 433, 437

[56] References Cited

U.S. PATENT DOCUMENTS

| 4,414,621 | 11/1983 | Bown et al. ............................. | 364/200 |
|---|---|---|---|
| 5,295,081 | 3/1994 | Habra ...................................... | 364/489 |
| 5,307,451 | 4/1994 | Clark ....................................... | 395/127 |
| 5,325,472 | 6/1994 | Horiuchi et al. ......................... | 395/127 |

FOREIGN PATENT DOCUMENTS 475581   3/1992   European Pat. Off. .

OTHER PUBLICATIONS

Shu, "Groupware Experiences in Three–Dimensional Computer–Aided Design", Master of Science Degree Requirement, Massachusetts Institute of Technology, Feb., 1992.

Sloof, G.W. et al "Design Data Managment in a Distributive Hardware Environment," *European Design Automation Conference*, 1990, pp. 34–38, (1990).

Biliris, Alexandros et al, "Design Versions in a Distributive CAD Environment," *Computer and Communications, 1989 International Conference*, pp. 354–359, (1989).

Yamamoto, G. et al, "A Distributed CAD System for Control System Design," *Industrial Electronics, Control, and Instrumentation, 1991 International Conference*, pp. 2305–2310, 1991.

Hardwick, Martain, et al, "Using a Relational Database as an Index to a Distribtued Object Database in Engineering Design Systems," *Data and Knowledge Systems for Manufacturing and Engineering, 1989 Conference*, pp. 4–11, (1989).

(List continued on next page.)

*Primary Examiner*—Mark R. Powell
*Attorney, Agent, or Firm*—Fitzpatrick Cella Harper & Scinto

[57] ABSTRACT

A plurality of stations (25, 26, 27) are connected to a central serving processor (37) via the public switched telephone network (33). Each station (25, 26, 27) includes a processing device (28) and a monitor (29) for generating an interactive three-dimensional graphics environment. Similar environments are provided on each remote station and interaction between the stations is facilitated by transmitting transformation matrices, modified by one station, to all of the other stations. Each transformation matrix defines a transformation of an object or a light source into the displayable space.

30 Claims, 5 Drawing Sheets

OPERATION OF COMMUNICATION IN CLIENT MACHINE.

OPERATION OF SERVER MACHINE.

OTHER PUBLICATIONS

Yamamoto, G. et al, "A Distributed Computing Environment for Control System Analysis and Design," *Computer–Aided Control System Design, 1992 Symposium (CACSD)*, pp. 47–54, (1992).

Faigle et al, "Movie. Model for Open System Based High Performance Distributive Computing", Visulization 1991 Conference IEEE/IEE Pub on Disc.

Greenberg et al, Issues & Experiences Designing & Implementing Two Group Drawing Fools, System Science 1992 Annual Hawaii Conference.

DeRoulhey et al A Remote Visual Interface Tool for Simulation Control and Display, National Aerospace and Electronics, 1991 Conference.

Robertson et al. "Distributed Visualizaton Using Workstations, Supercomputers, and High Speed Networks", Visualizations, 1991 Conference IEE Publication.

Fitzgerald et al., "Evaluating Alternative Display Sharing System Architectures" in Proc. of IEEE Conf. on Communications Software: Communications for Distributed Applications & Systems, Apr. 1991, pp. 145–147.

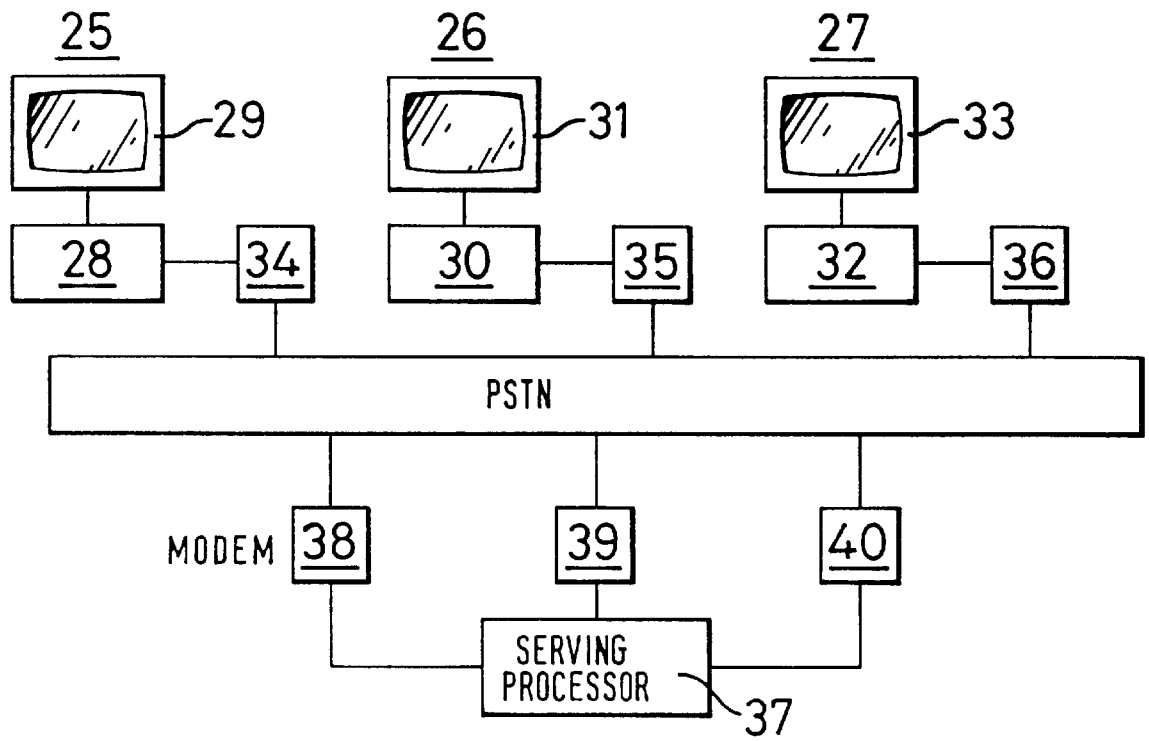
FIG. 2
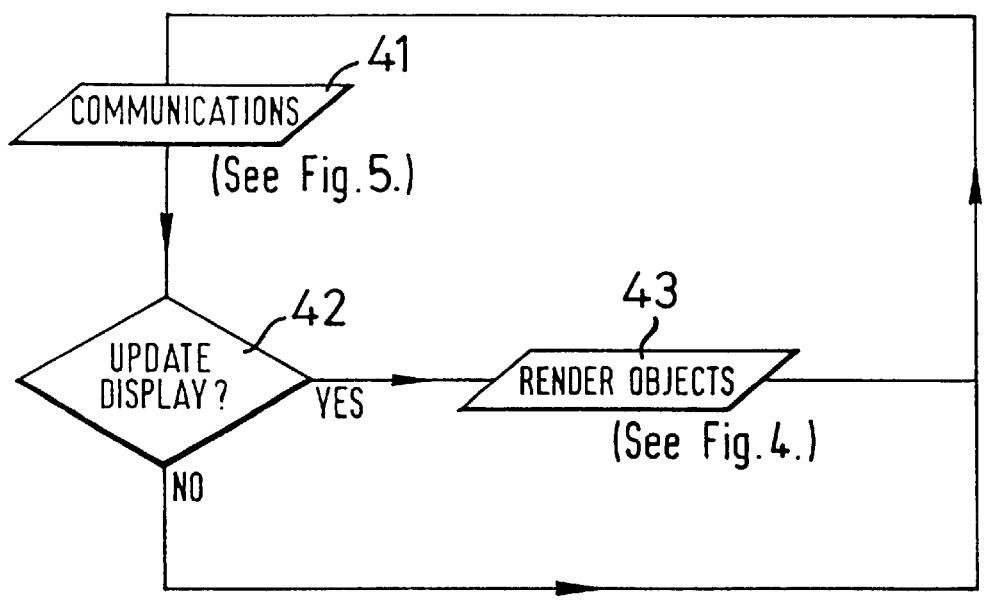
FIG. 3 OVERALL FLOW OF CONTROL IN CLIENT.

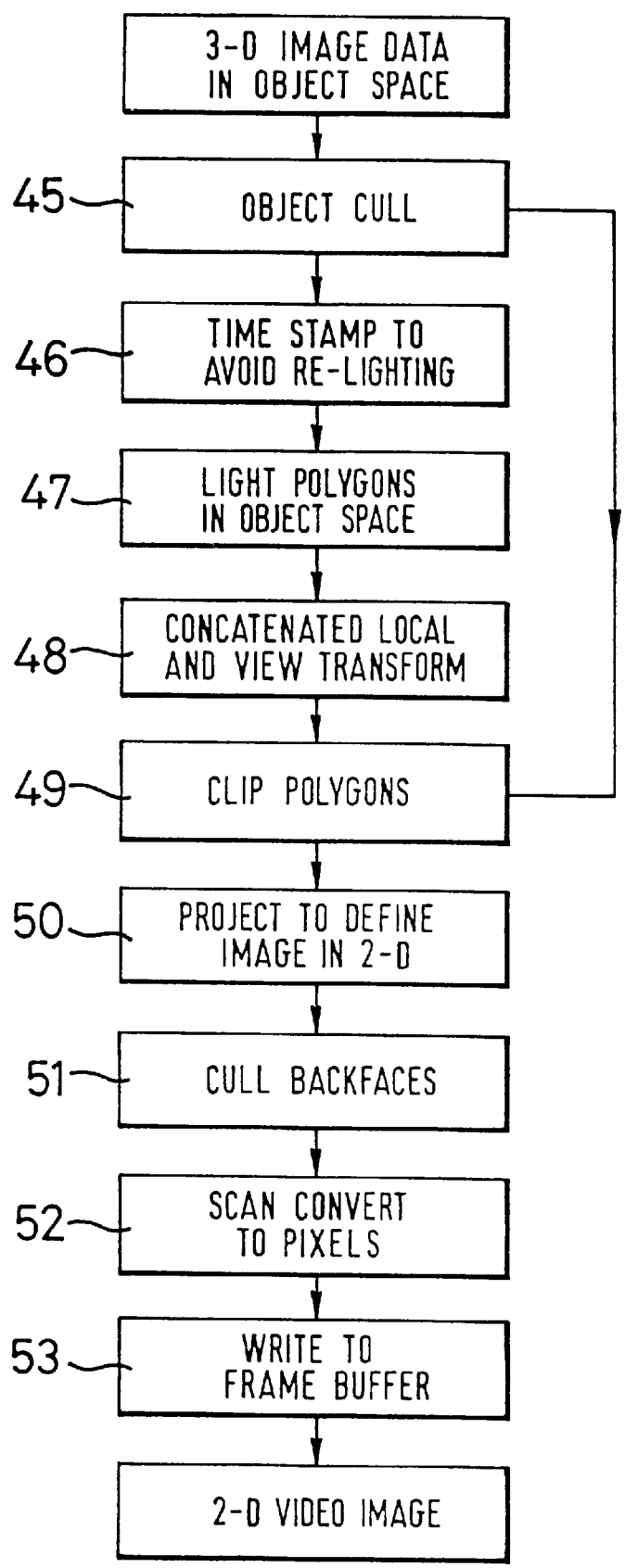

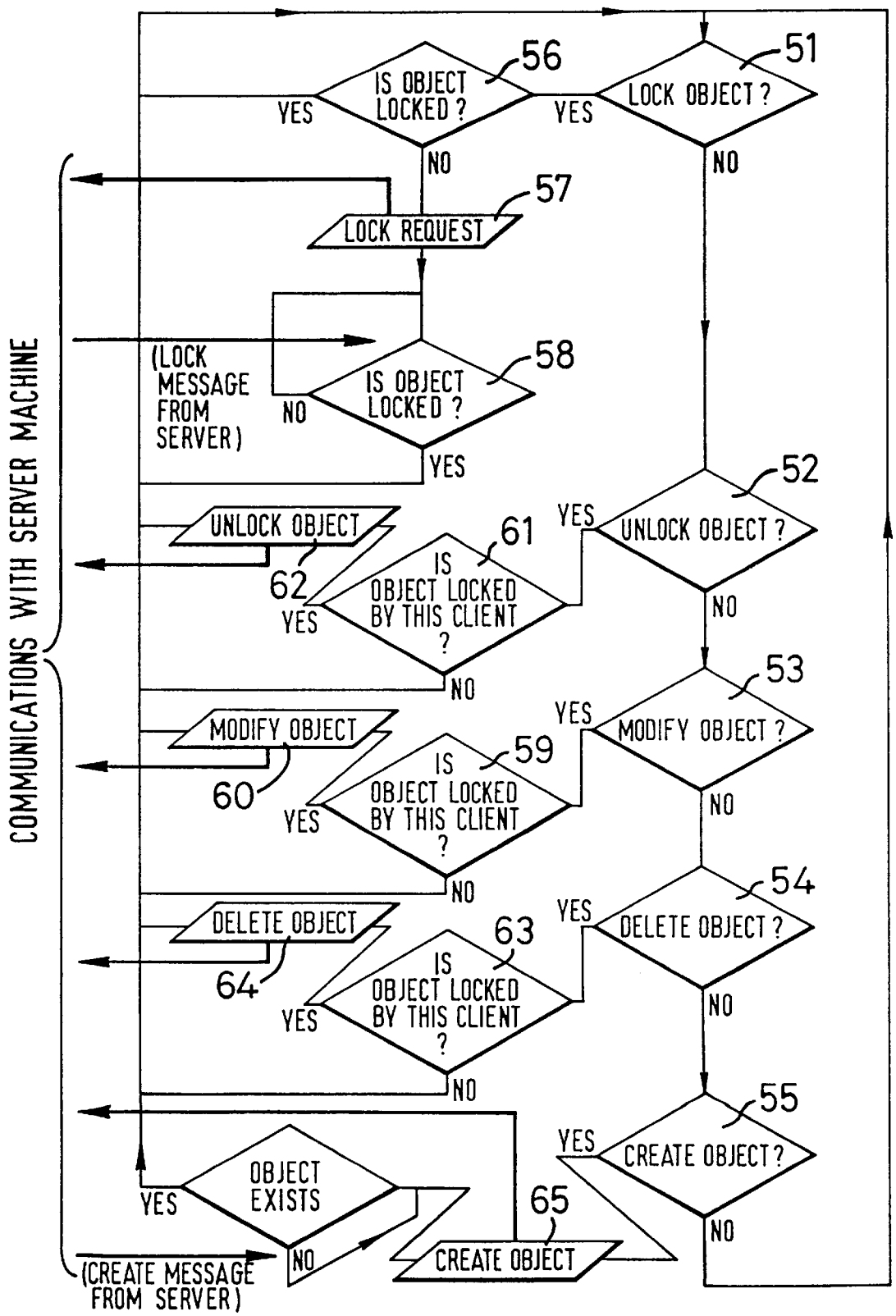

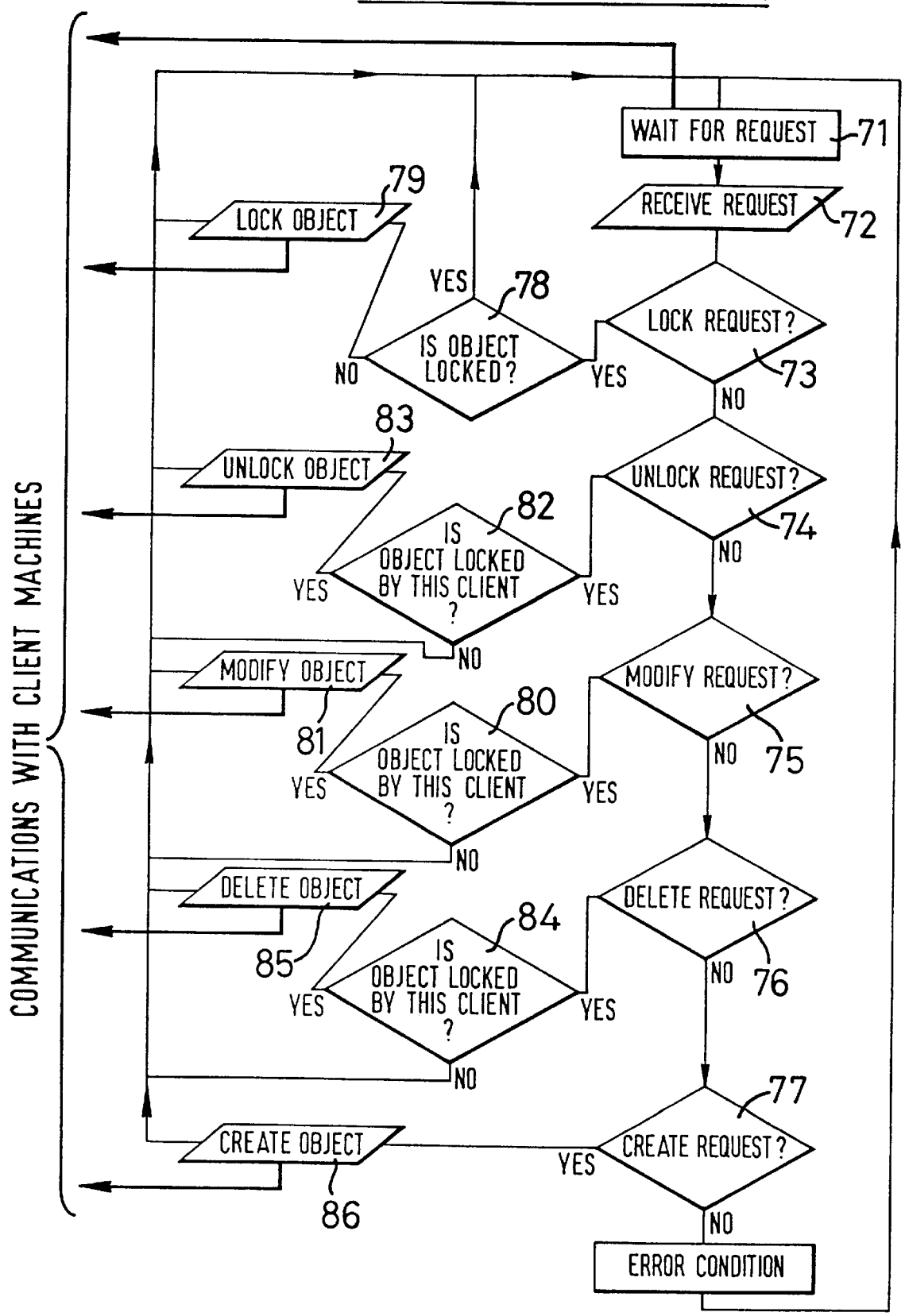
FIG. 6  OPERATION OF SERVER MACHINE.

APPARATUS AND METHOD FOR DISPLAYING IMAGES OF THREE-DIMENSIONAL OBJECTS TO FIRST AND SECOND USERS FROM DIFFERENT VIEWPOINTS SELECTED BY THE USERS

This application is a continuation of application Ser. No. 08/582,665, filed Jan. 4, 1996, now abandoned, which is a continuation of application Ser. No. 08/141,621, filed Oct. 27, 1993, now abandoned.

FIELD OF THE INVENTION

The present invention relates to apparatus and methods for processing image data.

In particular, the present invention relates to apparatus and methods for displaying three-dimensional images. Furthermore, the present invention relates to an interactive graphics system in which a plurality of users may access three-dimensional data.

BACKGROUND OF THE INVENTION

Systems are known which are capable of synthesizing two dimensional images in response to data defining elements within a three dimensional space. The final two-dimensional result may consist of a very large number of colored pictured elements (pixels) which may be viewed on a monitor or printed onto an image carrying medium.

In interactive systems arranged to generate data representing a three-dimensional space, objects appear to move within the three-dimensional space in response to input commands. Thus, in such systems a machine is required to render a two-dimensional image from data representing a three-dimensional space repeatedly, as the position and/or orientation of objects, light sources and view position change in response to input commands. Typically, in an interactive environment, a machine is required to produce output images at a rate of between five to twenty per second.

Interactive three-dimensional graphics systems have many applications and these applications could be extended further if many users could share access to a common three-dimensional world. Thus, information could be recorded in three-dimensional space and many users, each with their own display device, could be given access to this space, allowing them to observe the data created by other users and, possibly, modify this data. Thus, an interchange of ideas could be provided by giving access to shared three-dimensional data.

In interactive graphics systems output images are usually displayed on a monitor, similar to a conventional television receiver. Thus, a processor is required to generate a video signal which is supplied to the monitor at video rate. Often data is supplied to a frame buffer at an interactive rate and image data is then read from the frame buffer at video rate, in order to generate the video signal. Typically, a look-up table is provided, allowing a selection of colors to be defined in response to selections made by the limited number of bits stored in the look-up table. The look-up table itself may define particular colors and include values representing modifications to luminance and saturation.

Techniques for the transmission of video signals are well known and, in addition to one-way television broadcasts, it is also known to provide two-way video communication, such as in video conferencing facilities or video telephones.

However, a problem with transmitting video signals is that a substantial bandwidth is required, therefore transmission costs become high. A further problem arises, when sharing access to a three-dimensional world, in that additional communication channels are required for the control of access to that world, along with processing facilities to resolve contention problems. Furthermore, although the video image includes a large amount of data, it only represents a particular view of the three-dimensional world, rendered from a particular view point. Thus, any attempt to provide multiple access to the three-dimensional data is restricted to the particular view under consideration.

It is an object of the present invention to provide an improved apparatus for displaying three-dimensional images, in which a first station and a second station have shared access.

SUMMARY OF THE INVENTION

According to a first aspect of the present invention, there is provided apparatus for displaying three-dimensional images, comprising a first station having a processing device and a display device, and a second station having a processing device and a display device, wherein modifications made within a three-dimensional space displayable by said first station result in similar modifications to similar space displayable by said second station, each station including means for generating a video image from three-dimensional data and, on effecting a modification within the space displayable by said first station, means for transmitting modified three-dimensional data to said second station over a communication channel.

Thus, the present invention solves the problem of providing shared access by transmitting modified three-dimensional data between stations.

Three-dimensional data may represent shape geometry and transformations for transforming said geometry between frames of reference, such as between a modelling space for each specific object, three-dimensional world space and viewing space. In a preferred embodiment, data defining the transformations of objects are transmitted between stations.

Possibly, data representing transformation differences could be transmitted but in a preferred embodiment data representing a complete transformation is transmitted after said data has been modified. Preferably, the transformation data represents matrices.

In a preferred embodiment a central serving processor is provided and a plurality of users are allowed to modify data under the control of said server.

BRIEF DESCRIPTION OF THE DRAWINGS

FIG. 2 shows a plurality of client machine stations, of the type shown in FIG. 1, connected to a server machine;

FIG. 3 is an overview of the operations performed by a client machine of the type shown in FIG. 2, including communication procedures and rendering procedures;

FIG. 4 details the rendering procedures identified in FIG. 3;

FIG. 5 details the communication procedures identified in FIG. 3; and

FIG. 6 details communication procedures for the server machine identified in FIG. 2.

DETAILED DESCRIPTION OF THE PREFERRED EMBODIMENTS

Figure 1:
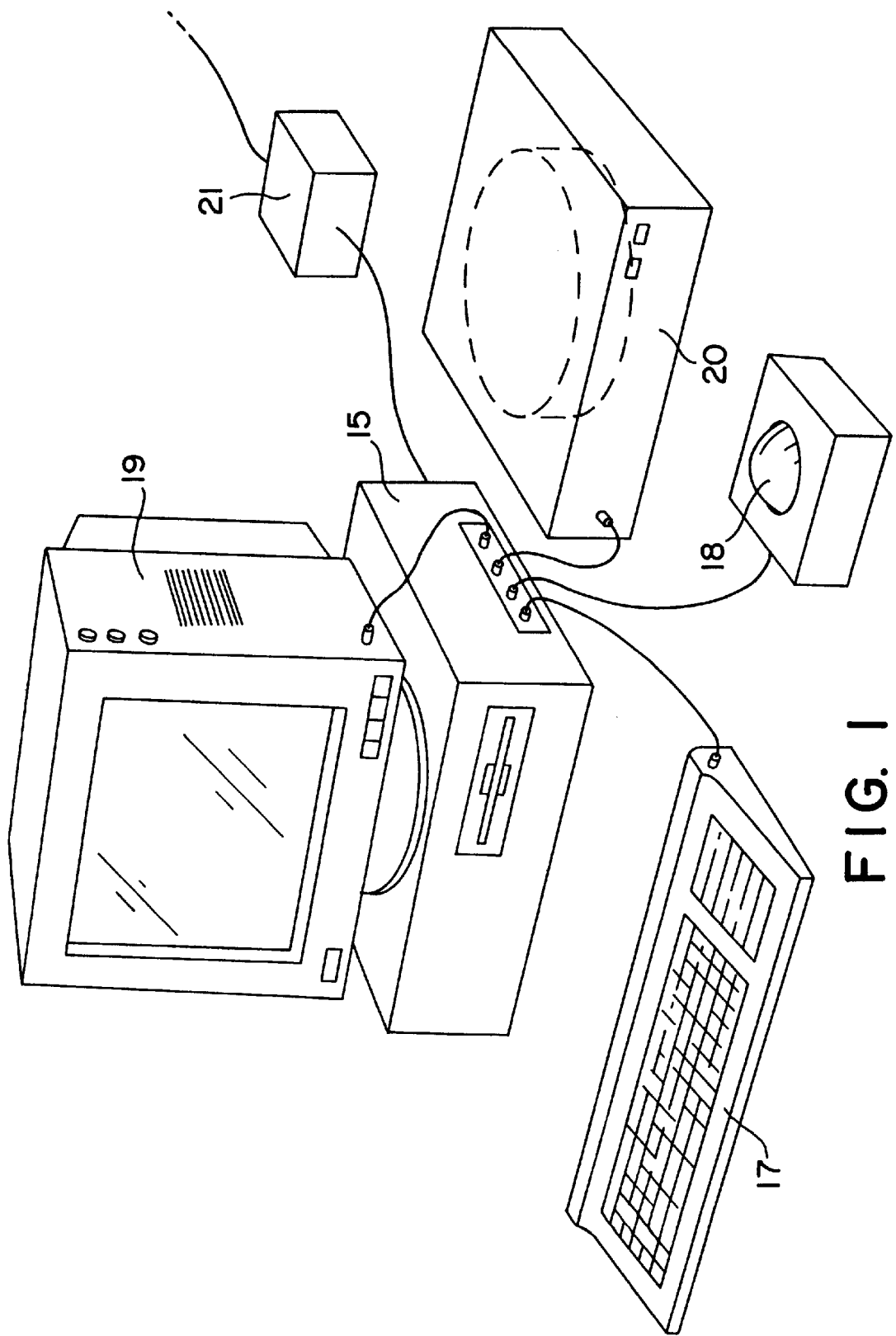
FIG. 1 shows an interactive three-dimensional graphics station, including a processor and a modem.

A system for processing image data representing three-dimensional objects is shown in FIG. 1. A processor 15 is arranged to write data to and read data from an internal memory device. Data stored in the memory device defines three-dimensional image data, two-dimensional image data and instructions to the processor, including instructions relating to communications with a central server.

The processor 15 receives input data from input devices, consisting of a manually operable keyboard 17 and a position sensitive device, such as a trackerball 18, a mouse or a digitising stylus etc.

Two-dimensional images are displayed on a visual display unit 19, which receives output image data at video rate by raster scanning a frame buffer, often provided with proprietary display units. The visual display unit 19 has a definition of, typically, one thousand lines with one thousand pixels on each line, requiring a frame buffer with one million pixel locations. For the bulk transfer of program data and image data, a mass storage device 20 is provided, such as a hard magnetic disk, optical disk or tape drive etc.

The processor 15 is connected to a modem 21, which is in turn connected to a conventional public telephone line. Thus, modem 21 allows processor 15 to communicate over any distance, using the public switched telephone network. The processor 15 may include instructions for initiating a connection to another system or, alternatively, means for establishing such a connection with another modem may be provided within modem 21.

A system embodying the present invention is shown in FIG. 2, in which, in this example, three systems of the type shown in FIG. 1 are provided. A first station 25 includes a first processing device 28 and a first display device 29. Similarly, a second station 26 includes a second processing device 30 and a second display device 31, while a third processing station includes a third processing device 32 and a third display device 33. Each processing device 28, 30, 32 is connected to the public switched telephone network (PSTN) 33 via respective modems 34, 35, 36. The PSTN 33 represents the global switched telecommunications network, allowing international communication. Thus, station 25 could be in Munich, station 26 in Washington and station 27 in Tokyo. Alternatively, other systems may be employed, such as dedicated lines or higher capacity switched networks, such as a packet switching network.

Each processor 28, 30, 32 of the user stations 25, 26, 27 communicates with a central serving processor 37 via respective modems 38, 39, 40. Thus, direct communication between remote stations is not permitted and all communications over the network are controlled by the serving processor 37.

The serving processor 37 is shown without an associated display device. In some situations a display device may be provided, although it is not essential to the operation of the system. It is envisaged that actual use of the networked environment is made by the remote stations.

However, the server does maintain a complete record of all three-dimensional data, so that said data may be supplied over the communication network when, for example, a new user station is connected to said network.

Three remote stations are shown in FIG. 2; it is also envisaged that many more stations could be connected to the network and the extent to which said stations may be given access to the graphics environment may vary. Thus, some stations may be allowed to make modifications while other stations may only be permitted to view what has already been created by others.

The processes performed by the processor 15, for creating an interactive three-dimensional graphics environment, are shown in FIG. 3. These processes are performed by processors 28, 30 and 32 as shown in FIG. 2, identified as client machines, as distinct from the serving machine 37 in FIG. 2.

At step 41, communications procedures are adopted which allow the processor to communicate with the serving processor via the PSTN 33 and their respective modems. The operations performed at step 41 are detailed in FIG. 5.

At step 42, a question is asked as to whether it is necessary to update the display, that is to say, whether it is necessary to render the three-dimensional data in order to generate new two-dimensional data. If this question is answered in the affirmative, step 43 executes the rendering process, detailed with reference to FIG. 4. Thereafter, control is returned to step 41, allowing further communications to be made. Similarly, if the question raised at step 42 is answered in the negative, control is returned to step 41.

FIG. 4 details the rendering operation identified as step 43 in FIG. 3. At step 45 object culling is performed by determining, after local transformation and viewing transformation, the extent to which an object can actually be seen. Extents are defined for the object in each dimension, that is to say, maximum and minimum values are determined for the object in each of the X, Y and Z dimensions. This process is facilitated by defining a cuboid bounding box of planes of constant x, y or z extent. The bounding box is transformed into viewing space and the position of the transformed bounding box is considered, to determine whether it is totally within the viewable space, totally outside the viewable space or intersecting the viewable space.

If an object is totally outside the viewable space no further processing is performed on the polygons defining such an object, thereby making a significant saving in processing time. For objects totally within the viewing space, processing continues on these polygons and no saving is made, however, the processing overhead for transforming the bounding box is quite modest. For objects which are partially within the viewable space and partially outside the viewable space, data defining the planes of intersection are stored for reconsideration at step 49, involving the clipping of polygons.

A clock is present which effectively gives a unique time stamp to each iteration. This stamp is then applied each time lighting is moved and each time surfaces are moved. Thus, if on a present iteration, it can be seen that no changes have occured to the position or orientation of the lighting, or to the position of polygons from the last iteration, lighting calculations, calculated on the previous iteration, are used again.

At step 47 the lighting of polygons, where necessary, is performed. In the present system, a local transformation is performed, surfaces are lit and a view transformation is effected. The local transformation and the view transformation are mathematically similar and, when performed by matrix multiplication, the matrices defining the transformations are concatenated into a common matrix. Thus, the local transformation and the viewing transformation are performed as one transformation from object space to viewing space. The viewing space represents a particular view of the total displayable space.

Before the viewing transformation can be effected, it is necessary to perform lighting calculations. In the present embodiment, this is effected by calculating the inverse to the local transformation, effecting this inverse transformation upon the position of light sources, thereby effectively transforming the light sources into object space. Thereafter, lighting calculations are performed in object space and the object is transformed directly from object space to viewing space, using the concatanated matrix. Thus, the concatenated matrix used to transform the bounding box during the object cull, at step 45, is used again to transform the actual object polygons from object space into viewing space, at step 48.

Step 49 involves the clipping of polygons which do not lie within the viewing space. As previously stated, additional information is generated at step 45, during the object culling process, which identifies planes bounding the viewing space through which objects intersect.

At step 50, the three-dimensional object is projected into a two-dimensional image and at step 51, backface culling is performed which, in the present embodiment, does not require reference to the polygon normals. Step 52 provides scan conversion and during this process account is taken of the restricted size of most frame buffers which typically have only eight bits per pixel location. Thereafter, a two-dimensional video image is produced by raster scanning the frame buffer at video rate.

Thus, it can be appreciated that the three-dimensional image is constructed by transforming object geometry into a viewing space, from which a particular two-dimensional view is rendered. The position of object geometry, lighting and view position is defined by matrices and, during interactive operation, it will be the values within these matrices which undergo modification.

In the preferred embodiment, transformations are defined by matrices having four rows and four columns with four bytes of data allocated to each position within the matrix, facilitating floating point manipulations. Each matrix therefore consists of 64 bytes of data.

In the preferred embodiment, each remote station 25, 26 and 27 has its own local representation of image geometry. The geometry may be the same, such that substantially the same image is seen at each station. Alternatively, geometry may differ substantially or alternatively and perhaps more appropriately, the geometry may differ only in more subtle ways. Thus, for example, each station may include geometry representing a chair and said chair may have the same unique identification name at each station. However, the chair may be different in design or may be a different color at each of the different stations.

As previously stated, interactive operation at a station results in modification to transformation matrices. The system shown in FIG. 2 operates by transmitting new matrix data to all of the stations, such that an interactive modification in three-dimensional space at one station will result in a similar modification to the space at all of the other stations. Thus, each station maintains its own version of a shared three-dimensional world and the amount of data required to maintain equivalent versions consists only of the matrices required to effect transformations. Thus, even when connected by a channel having very limited bandwidth, such as a telephone line, each station is updated with interactive modifications made at any of the other stations.

Input commands from the keyboard 17 or the tracker ball 18, are arranged to provide information to the communications process 41, identifying an operator's desire to lock an object, unlock an object, modify the position of an object, delete an object or create an object. The rendered output displayed to each client is dependent upon that clients own view position within the three-dimensional space, identified within said space by a suitable object such as a camera. Other cameras are present within the space, identifying the view position of other clients within the network and each camera remains permanently locked to its respective client, so that the particular client cannot move the cameras of others and the client's own camera cannot be moved by the other clients.

Before an object may be modified by a client, it is necessary for that object to be locked and the locking and unlocking of objects is controlled by the central server. Thus, a client may request access to an object, which may or may not be given by the server, dependent upon whether any other client has previously locked that particular object. During operation, a client may lock as many objects as are available and when locked, access to these objects is not permitted by any of the other clients in the network.

Referring to FIG. 3, on entering step 41, enquiries are made as to whether any commands have been generated by the client operator. Referring to FIG. 5, a question is asked at step 51 as to whether a request has been made to lock an object. If this question is answered in the negative, a question is asked at step 52 as to whether a command has been made to unlock an object. If this question is answered in the negative, a further question is asked at step 53 as to whether the operator wishes to modify an object. Again, if this question is answered in the negative, a further question is asked at step 54 as to whether the operator wishes to delete an object and if this question is answered in the negative, a question is asked at step 55 enquiring as to whether the operator wishes to create an object. If this final question at step 55 is answered in the negative, all possible meaningful input commands have been tested, thereby completing the communications iteration and passing control to step 42 in FIG. 3, identified in FIG. 5 by the arrow returning control to the top of the loop.

If the question asked at step 51 is answered in the affirmative, a question is asked at step 56 as to whether the object has already been locked. When an object has been locked by a client, this information is supplied to all other clients in the network, therefore a list of locked objects is retained by all clients, allowing the question asked at step 56 to be answered. If the question asked at step 56 is answered in the affirmative, to the effect that the object has been locked, the object is not available to the client and the procedure terminates.

If the object has not been locked and the question asked at step 56 is answered in the negative, a lock request is made at step 57 over the communications channel. In response to this lock request, the central server issues a lock message, thus a question is asked at step 58 as to whether the object has been locked and this question is only answered in the affirmative when the lock message from the server has been received. The receipt of this message allows the processor to leave the loop surrounding step 58, allowing a further iteration to be made.

It should be noted that, during these communication procedures, no modifications will have been made to the graphics display, therefore the question asked at step 42 will be answered in the negative and control will be returned to the process shown in FIG. 5. Thus, after requesting the locking of an object, a further instruction may be made to modify the position of the object. Such an instruction results in the question asked at step 53 being answered in the affirmative and a further question being asked at step 59 as to whether the object to be modified has been locked by the client wishing to modify it. If the question asked at step 59 is answered in the negative, modification is not permitted and control is returned. However, if the client wishing to modify an object has successfully locked use of that object, data relating to the modifications are supplied to the central server at step 60.

After making modifications, the client would wish to unlock the object so that other clients may gain access to it. Again, an input command is made to this effect which, on the next iteration, is identified by the question asked at step 52 being answered in the affirmative. This results in a question being asked at step 61 as to whether the object was previously locked by this client. Again, if this question is answered in the negative, control is returned but if this question is answered in the affirmative, an instruction is sent to the server to the effect that the object is to be unlocked. Again, this information is relayed by the server to all other clients within the network.

The question asked at step 54 allows a client to delete an object and again the question is asked at step 63 as to whether the object has previously been locked by the client wishing to make the request to delete. If this question is answered in the affirmative, deletion instructions are generated at step 64, which are supplied to the central server, thereby deleting the object from the space under consideration. Again, the server will supply this information to all other clients.

A similar procedure is provided in response to the question asked at step 55 which, when answered in the affirmative, allows an object to be created at step 65.

Operation of the serving processor 37 is detailed in FIG. 6. In a preferred embodiment, server 37 is only concerned with the communication of data between the clients and does not itself have to perform a rendering operation.

Not being required to perform rendering allows the serving processor 37 to wait for external communications at step 71. Upon receiving information from a client at step 72, enquiries are made as to the nature of the request, at steps 73, 74, 75, 76 and 77. If all of these questions are answered in the negative, the input data is assumed to be in error and control is returned to the waiting condition at step 71.

A request to lock an object is identified at step 73 and results in a question being asked at step 78 as to whether the object has already been locked. This question should be answered in the negative, given that a request to lock a previously locked object would have been rejected at step 56 in FIG. 5, thereby preventing a lock request from being sent. On answering the question raised at step 78 in the negative, a command is sent back to the client machine at step 79, confirming the lock and control is returned to the wait condition at step 71.

A request to modify an object is identified at step 75 and results in a question being asked at step 80 as to whether the object was previously locked by the requesting client. Again, this question would normally be answered in the affirmative, given that a similar check is made at step 59. On the question at step 80 being answered in the affirmative, communication is permitted at step 81, allowing the modifications to be effected.

Requests to unlock an object are identifed at step 74 and again a check is made at step 82 as to whether the object was previously locked by the client requesting an unlock. Again this question should be answered in the affirmative, given that a similar check is raised at step 61 and thereafter an unlock command is generated at step 83.

Deletion requests are identified at step 76 and again a question is asked at step 84 as to whether the client requesting deletion has previously locked use of the object. On the question raised at step 84 being answered in the affirmative, communication relating to the deletion is permitted at step 85.

Object creation request are identified at step 77 and communication relating to the creation of objects is carried out at step 86.

Typically, modems 34, 35, 36, 38, 39, 40 provide transmission at 1600 bytes per second, which allows one selected object to be updated twenty times per second. Time stamping information is added to each update, thereby ensuring that updates are re-sequenced, if necessary at a receiver into the correct order. Thus, the correct interval between each update can be re-established at the receiving station independently of the transmission speed, thereby faithfully reproducing an original movement.

It is important that communications requesting access to an object and communications relinquishing the locking of an object are conveyed accurately using reliable codes, such as TCP-IP. However, given that a complete matrix defining a complete transformation is transmitted, it is allowable for data relating to matrices to be lost, given that the correct data will be sent on the next iteration. Furthermore, it is possible for terminals and communication channels to operate at different speeds, wherein some terminals will receive all iterations while others recieve a lower number of samples.

What we claim is:

1. Apparatus for displaying images of three-dimensional objects to first and second users, comprising:

a first station having a first storage device storing first object data representing said three-dimensional objects in a three-dimensional space, and a first display device for displaying images of said three dimensional objects in accordance with the first object data from a first viewpoint selected by the first user in said three-dimensional space; and a second station having a second storage device storing second object data representing said three dimensional objects in said three-dimensional space and a second display device for displaying images of said three-dimensional objects in accordance with the second object data from a second viewpoint selected by the second user in said three-dimensional space, said first station further comprising (i) an editing device by which the first user interactively makes modifications of the first object data to produce modified first object data in the first storage device and to display in real time images of said three-dimensional objects on said first display device in accordance with the modified first object data from the first viewpoint, and (ii) a transmitter for transmitting modification data representing said modifications to said second station over a communication channel, said second station further comprising a processing device for receiving said modification data and for making modifications of the second object data corresponding to said modifications of the first object data to produce modified second object data in the second storage device and to display images of said-three-dimensional objects on said second display device in accordance with the modified second object data from the second viewpoint selected by the second user, wherein said second object data includes geometry data defining said three-dimensional objects and transformation data defining a position of each object in said three-dimensional space, said modification data comprises data defining modified transformation data for a given one of said objects, and said transformation data represents matrices.

2. Apparatus according to claim 1, wherein said modification data comprises complete new transformation data for the given object.

3. Apparatus according to claim 1, wherein said communication channel forms part of a telephone network.

4. Apparatus according to claim 1, wherein said first and second stations are connected by a central server.

5. A method of displaying images of three-dimensional objects for an interactive image display system comprising a first display station having (i) a first storage device storing first object data representing three-dimensional objects in a three-dimensional space and (ii) a first display device, and a second display station having (i) a second storage device storing second object data representing said three-dimensional objects in said three-dimensional space and (ii) a second display device, said method comprising the steps of:

processing the first object data to display images, on the first display device, of said three-dimensional objects from a first viewpoint in said three-dimensional space;

processing the second object data to display images, on the second display device, of said three-dimensional objects from a second viewpoint in said three-dimensional space;

modifying interactively the first object data to produce modified first object data in the first storage device;

processing the modified first object data so that images of said three-dimensional objects are displayed in real time on the first display device in accordance with the modified first object data from the first viewpoint;

transmitting modification data representing said modifications to the second station over a communication channel;

receiving said modification data at the second station, and making modifications of the second object data corresponding to said modifications of the first object data to produce modified second object data in the second storage device; and processing said modified second object data to display images of said three-dimensional objects on the second display device in accordance with the modified second object data from the second viewpoint, wherein said second object data includes geometry data defining said three-dimensional objects and transformation data defining a position of each object in said three-dimensional space, said modification data comprises data defining modified transformation data for a driven one of said objects, and said transformation data represents matrices.

6. A method according to claim 5, wherein said modification data comprises complete new transformation data for the given object.

7. A method according to claim 5, wherein the communication channel forms part of a telephone network.

8. A method according to claim 5, wherein the first and second stations are connected by a central server.

9. Apparatus according to claim 1, wherein said second station further comprises (i) an editing device by which the, second user interactively makes second modifications of the second object data to produce further modified second object data in the storage device of said second station, and to display in real time images of said three-dimensional objects on said second display device in accordance with the further modified second object data from the second viewpoint, and (ii) a transmitter for transmitting second modification data representing said second modifications to said first station over a communications channel, and said first station further comprises a processing device for receiving said second modification data and for making further modifications of the first object data corresponding to said second modifications, to produce further modified first object data in the storage device of the first station, and to display images of the three-dimensional objects on the first display device in accordance with the further modified first object data from the first viewpoint selected by the first user, wherein said first object data includes geometry data defining said three-dimensional objects and transformation data defining a position of each object in said three-dimensional space, said second modification data comprises data defining modified transformation data for a given one of said objects, and said transformation data represents matrices.

10. Apparatus according to claim 9, further comprising a serving processor for permitting modifications of object data representing a given one of said objects to be initiated by only one of the first and second users at a given time.

11. Apparatus according to claim 4, wherein said central server includes a data storage device storing third object data representing said three-dimensional objects in said three-dimensional space.

12. A method according to claim 5, further comprising the steps of:

interactively making second modifications of the second object data to produce further modified second object data in the second storage device;

processing the further modified second object data to display in real time images of said three-dimensional objects on the second display device in accordance with the further modified second object data from the second viewpoint;

transmitting second modification data representing said second modifications to the first station over a communication channel;

receiving said second modification data at the first station, and making modifications of the first object data corresponding to said second modifications, to produce further modified first object data in the first storage device; and processing said further modified first object data to display images of the three-dimensional objects on the first display device in accordance with the further modified first object data from the first viewpoint, wherein said first object data includes geometry data defining said three-dimensional objects and transformation data defining a position of each object in said three-dimensional space, said second modification data comprises data defining modified transformation data for a given one of said objects, and said transformation data represents matrices.

13. A method according to claim 5, further comprising the step of permitting modifications of object data representing a given one of said objects to be initiated at only one of the first and second stations at a given time.

14. A method according to claim 11, wherein the central server includes a third storage device and said method further comprises the step of storing in the third storage device third object data representing said three-dimensional objects in said three-dimensional space.

15. A data storage device storing instructions for a programmable interactive image display system comprising a first display station having (i) a first storage device storing first object data representing three-dimensional objects in a three-dimensional space and (ii) a first display device, and a second display station having (i) a second storage device storing second object data representing said three-dimensional objects in said three-dimensional space and (ii) a second display device, such that, when said instructions are loaded into the system, the system is caused to display images of the three-dimensional objects at the first and second stations, by a method comprising the steps of:

processing the first object data to display images, on the first display device, of said three-dimensional objects from a first viewpoint in said three-dimensional space;

processing the second object data to display images, on the second display device, of said three-dimensional objects from a second viewpoint in said three-dimensional space;

modifying interactively the first object data to produce modified first object data in the first storage device;

processing the modified first object data so that images of said three-dimensional objects are displayed in real time on the first display device in accordance with the modified first object data from the first viewpoint;

transmitting modification data representing said modifications to the second station over a communication channel;

receiving said modification data at the second station, and making modifications of the second object data corresponding to said modifications of the first object data to produce modified second object data in the second storage device; and processing said modified second object data to display images of said three-dimensional objects on the second display device in accordance with the modified second object data from the second viewpoint, wherein said second object data includes geometry data defining said three-dimensional objects and transformation data defining a position of each object in said three-dimensional space, said modification data comprises data defining modified transformation data for a given one of said objects, and said transformation data represents matrices.

16. A data storage device according to claim 15, wherein said method further comprises the steps of:

interactively making second modifications of the second object data to produce further modified second object data in the second storage device;

processing the further modified second object data to display in real time images of said three-dimensional objects on the second display device in accordance with the further modified second object data from the second viewpoint;

transmitting second modification data representing said second modifications to the first station over a communication channel;

receiving said second modification data at the first station, and making modifications of the first object data corresponding to said second modifications, to produce further modified first object data in the first storage device; and processing said further modified first object data to display images of the three-dimensional objects on the first display device in accordance with the further modified first object data from the first viewpoint, wherein said first object data includes geometry data defining said three-dimensional objects and transformation data defining a position of each object in said three-dimensional space, said second modification data comprises data defining modified transformation data for a given one of said objects, and said transformation data represents matrices.

17. A data storage device according to claim 15, wherein said modification data comprises complete new transformation data for the given object.

18. A data storage device according to claim 15, wherein the communication channel forms part of a telephone network.

19. A data storage device according to claim 15, wherein the first and second stations are connected by a central server.

20. A data storage device according to claim 16, wherein said instructions permit modifications of object data representing a given one of said objects to be initiated at only one of the first and second stations at a given time.

21. A data storage device according to claim 19, wherein the central server includes a third storage device and said method further comprises the step of storing in the third storage device third object data representing said three-dimensional objects in said three-dimensional space.

22. In an interactive image display system for displaying images of three-dimensional objects to a first user at a first display station and a second user at a second display station, the first display station having (i) a first storage device storing first object data representing said three-dimensional objects in a three-dimensional space and (ii) a first display device, and the second display station having (i) a second storage device storing second object data representing said three-dimensional objects in said three-dimensional space and (ii) a second display device, a method of operating the first display station comprising the steps of:

processing the first object data to display images on said first display device of said three-dimensional objects from a first viewpoint in said three-dimensional space;

modifying interactively the first object data to produce modified first object data in the first storage device;

processing the modified first object data so that images of said three-dimensional objects are displayed in real time on the first display device in accordance with the modified first object data from the first viewpoint; and generating a signal conveying modification data representing said modifications for transmission to said second display station, wherein said second object data includes geometry data defining said three-dimensional objects and transformation data defining a position of each object in said three-dimensional space, said modification data comprises data defining modified transformation data for a given one of said objects, and said transformation data represents matrices.

23. A method according to claim 22, further comprising the steps of:

receiving second modification data sent from the second display station, said second modification data representing second modifications made interactively by the second user to the second object data from a second viewpoint in said three-dimensional space;

in response to the second modification data, making modifications of the first object data corresponding to said second modifications to produce further modified first object data in the first storage device; and processing said further modified first object data to display images of the three-dimensional objects on the first display device in accordance with the further modified first object data from the first viewpoint in real time as the second modification data is received, wherein said first object data includes geometry data defining said three-dimensional objects and transformation data defining a position of each object in said three-dimensional space, said second modification data comprises data defining modified transformation data for a given one of said objects, and said transformation data represents matrices.

24. In an interactive image display system for displaying images of three-dimensional objects to a first user at a first display station and a second user at a second display station, the first display station having (i) a first storage device storing first object data representing said three-dimensional objects in a three-dimensional space and (ii) a first display device, and the second display station having (i) a second storage device storing second object data representing said three-dimensional objects in said three-dimensional space and (ii) a second display device, a method of operating the second display station comprising the steps of:

processing the second object data to display images on the second display device of said three-dimensional objects from a second viewpoint selected by the second user in said three-dimensional space;

receiving modification data sent from the first station, said modification data representing modifications made interactively by the first user to the first object data from a first viewpoint in said three-dimensional space;

in response to the modification data, making modifications of the second object data corresponding to said modifications of the first object data to produce modified second object date in the second storage device; and processing said modified second object data to display images of said three-dimensional objects on the second display device in accordance with the modified second object data from the second viewpoint in real time as the modification data is received, wherein said second object data includes geometry data defining said three-dimensional objects and transformation data defining a position of each object in said three-dimensional space, said modification data comprises data defining modified transformation data for a given one of said objects, and said transformation data represents matrices.

25. A data storage device storing instructions for a first programmable processing display station such that, when said instructions are loaded into the first display station, the first display station is programmed to perform a method for use in an interactive image display system for displaying images of three-dimensional objects to a first user at the first display station and a second user at a second display station, the first display station having (i) a first storage device storing first object data representing said three-dimensional objects in a three-dimensional space and (ii) a first display device, and the second display station having (i) a second storage device storing second object data representing said three-dimensional objects in said three-dimensional space and (ii) a second display device, said instructions being such as to cause the first display station to perform the method comprising the steps of:

processing the first object data to display images on said first display device of said three-dimensional objects from a first viewpoint in said three-dimensional space;

modifying interactively the first object data to produce modified first object data in the first storage device;

processing the modified first object data so that images of said three-dimensional objects are displayed in real time on the first display device in accordance with the modified first object data from the first viewpoint; and generating a signal conveying modification data representing said modifications for transmission to said second display station, wherein said second object data includes geometry data defining said three-dimensional objects and transformation data defining a position of each object in said three-dimensional space, said modification data comprises data defining modified transformation data for a given one of said objects, and said transformation data represents matrices.

26. A data storage device according to claim 25, wherein said method further comprises the steps of:

receiving second modification data sent from the second display station, said second modification data representing second modifications made interactively by the second user to the second object data from a second viewpoint in said three-dimensional space;

in response to the second modification data, making modifications of the first object data corresponding to said second modifications to produce further modified first object data in the first storage device; and processing said further modified first object data to display images of the three-dimensional objects on the first display device in accordance with the further modified first object data from the first viewpoint in real time as the second modification data is received, wherein said first object data includes geometry data defining said three-dimensional objects and transformation data defining a position of each object in said three-dimensional space, said second modification data comprises data defining modified transformation data for a given one of said objects, and said transformation data represents matrices.

27. A data storage device storing instructions for use in an interactive image display system including at least a first and a second display station such that, when said instructions are loaded into the second display station, the second display station is programmed to perform a method for displaying images of three-dimensional objects to a first user at the first display station and a second user at the second display station, the first display station having (i) a first storage device storing first object data representing said three-dimensional objects in a three-dimensional space and (ii) a first display device, and the second display station having (i) a second storage device storing second object data representing said three-dimensional objects in said three-dimensional space and (ii) a second display device, said instructions being such as to cause the second display station to perform the method comprising the steps of:

processing the second object data to display images on the second display device of said three-dimensional objects from a second viewpoint selected by the second user in said three-dimensional space;

receiving modification data sent from the first station, said modification data representing modifications made interactively by the first user to the first object data from a first viewpoint in said three-dimensional space;

in response to the modification data, making modifications of the second object data corresponding to said modifications of the first object data to produce modified second object date in the second storage device; and processing said modified second object data to display images of said three-dimensional objects on the second display device in accordance with the modified second object data from the second viewpoint in real time as the modification data is received, wherein said second object data includes geometry data defining said three-dimensional objects and transformation data defining a position of each object in said three-dimensional space, said modification data comprises data defining modified transformation data for a given one of said objects, and said transformation data represents matrices.

28. Apparatus for use as a display station in an interactive system displaying images of three-dimensional objects to first and second users, the apparatus comprising:

a first storage device for storing first object data representing said three-dimensional objects in a three-dimensional space;

a first display device for displaying images of said three-dimensional objects in accordance with the first object data from a first viewpoint selected by the first user in said three-dimensional space;

an editing device by which the first user can interactively make modifications of the first object data to produce modified first object data in the first storage device and to display in real time images of said three-dimensional objects on said first display device in accordance with the modified first object data from the first viewpoint; and a signal generator for generating a signal conveying modification data representing said modifications for transmission to a second display station, wherein said second object data includes geometry data defining said three-dimensional objects and transformation data defining a position of each object in said three-dimensional space;

said modification data comprises data defining modified transformation data for a given one of said objects, and said transformation data represents matrices.

29. Apparatus according to claim 28, further comprising a processing device for (i) receiving second modification data sent from an apparatus operated by the second user, said second modification data representing second modifications interactively made by the second user to second object data representing said three-dimensional objects in said three-dimensional space stored in the apparatus operated by the second user (ii) making further modifications of the first object data corresponding to said second modifications, to produce further modified first object data in the storage device of the first station, and (iii) displaying images of the three-dimensional objects on the first display device in accordance with the further modified first object data from the first viewpoint selected by the first user, wherein said first object data includes geometry data defining said three-dimensional objects and transformation data defining a position of each object in said three-dimensional space, said second modification data comprises data defining modified transformation data for a given one of said objects, and said transformation data represents matrices.

30. Apparatus for use as a display station in an interactive system displaying images of three-dimensional objects to first and second users, the apparatus comprising:

a first storage device for storing first object data representing said three-dimensional objects in a three-dimensional space;

a first display device for displaying images of said three-dimensional objects in accordance with the first object data from a first viewpoint selected by the first user in said three-dimensional space; and a processing device for (i) receiving modification data sent from an apparatus operated by the second user, said modification data representing modifications interactively made by the second user to second object data representing said three-dimensional objects in said three-dimensional space stored in the apparatus operated by the second user, (ii) making modifications of the first object data corresponding to the said modifications of the second object data, to produce modified first object data in the first storage device, and (iii) displaying images of said three-dimensional objects on said first display device in accordance with the modified first object data from the first viewpoint selected by said first user in real time as the modification data is received, wherein said second object data includes geometry data defining said three-dimensional objects and transformation data defining a position of each object in said three-dimensional space, said modification data comprises data defining modified transformation data for a given one of said objects, and said transformation data represents matrices.

* * * * *

UNITED STATES PATENT AND TRADEMARK OFFICE
CERTIFICATE OF CORRECTION

PATENT NO.   : 6,025,846
DATED        : February 15, 2000
INVENTOR(S)  : Martin John Chudley It is certified that error appears in the above-identified patent and that said Letters Patent is hereby corrected as shown below:

Title page,
Item [56], References Cited, under OTHER PUBLICATIONS:
After "Hardwick, Martain, et al." "Distribtued" should read -- Distributed --;
After "Greenberg et al," "Fools," should read -- Tools, --;
"DeRoulhey et al" should read -- DeRouchey et al. --; and
After "Robertson et al." "IEE" should read -- IEEE --; and
Under *Attorney, Agent, or Firm:*
"Fitzpatrick Cella Harper & Scinto" should read
-- Fitzpatrick, Cella, Harper & Scinto --.

Column 5,
Line 3, "concatanated" should read -- concatenated --; and
Line 64, "clients" should read -- client's --.

Column 8,
Line 1, "request" should read -- requests --;
Line 29, "three dimensional" should read -- three-dimensional --;
Line 34, "three dimensional" should read -- three-dimensional --; and
Line 55, "said-three-dimensional" should read -- said three-dimensional --.

Column 9,
Line 55, "the," should read -- the --.

Column 10,
Line 56, "claim 5," should read -- claim 12, --; and
Line 60, "claim 11," should read -- claim 8, --.

Column 13,
Line 36, "date" should read -- data --.

Column 15,
Line 6, "date" should read -- data --.

UNITED STATES PATENT AND TRADEMARK OFFICE
CERTIFICATE OF CORRECTION

PATENT NO. : 6,025,846
DATED : February 15, 2000
INVENTOR(S) : Martin John Chudley It is certified that error appears in the above-identified patent and that said Letters Patent is hereby corrected as shown below:

<u>Column 16,</u>
Line 3, "user" should read -- user, --.

Signed and Sealed this

Sixteenth Day of July, 2002

Attest:

JAMES E. ROGAN
Attesting Officer  *Director of the United States Patent and Trademark Office*